(12) United States Patent
White et al.

(10) Patent No.: US 6,490,524 B1
(45) Date of Patent: Dec. 3, 2002

(54) POST-PROCESSING OF NMEA DATA

(75) Inventors: Eric S. White, Mountain View, CA (US); Lisa Wetherbee, Campbell, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/517,117

(22) Filed: Mar. 7, 2000

(51) Int. Cl.[7] ............................................. G01C 21/26
(52) U.S. Cl. ................... 701/215; 701/213; 701/214; 342/357.01; 342/357.06; 342/357.1
(58) Field of Search ................................ 701/213, 214, 701/215, 207; 342/357.06, 357.12, 357.1, 357.03, 357.02, 357.17, 352

(56) References Cited

U.S. PATENT DOCUMENTS

| | | | | |
|---|---|---|---|---|
| 5,477,458 A | * | 12/1995 | Loomis | 701/215 |
| 5,563,607 A | * | 10/1996 | Loomis et al. | 342/357 |
| 5,638,077 A | * | 6/1997 | Martin | 342/357 |
| 5,796,365 A | * | 8/1998 | Lewis | 342/357 |
| 5,899,957 A | * | 5/1999 | Loomis | 701/214 |
| 5,928,306 A | * | 7/1999 | France et al. | 342/451 |
| 5,952,958 A | * | 9/1999 | Speasl et al. | 342/357 |
| 5,986,575 A | * | 11/1999 | Jones et al. | 340/906 |
| 6,061,632 A | * | 5/2000 | Dreier | 701/215 |
| 6,144,335 A | * | 11/2000 | Rogers et al. | 342/357.03 |
| 6,212,475 B1 | * | 4/2001 | France et al. | 701/214 |
| 6,307,505 B1 | * | 10/2001 | Green | 342/357.09 |
| 6,326,916 B1 | * | 12/2001 | Green | 342/357.02 |

* cited by examiner

Primary Examiner—Jacques H. Louis-Jacques
(74) Attorney, Agent, or Firm—Wagner, Murabito & Hao LLP

(57) ABSTRACT

A method and system thereof for processing data in real time or post-processing, such as Global Positioning System (GPS) data that have been formatted in the National Marine Electronics Association (NMEA) format. In the GPS embodiment, uncorrected GPS data indicating an estimated position are computed by a receiver via signals from a first broadcaster (e.g., GPS satellites). Differential GPS (DGPS) data are received by the receiver via a signal from a second broadcaster (e.g., a GPS base station). A message is generated by the receiver when the signal from the second broadcaster is not received. The message contains information sufficient to identify the DGPS data stored by the second broadcaster needed to correct the uncorrected GPS data. The message and the uncorrected GPS data are stored by the receiver for subsequent processing. The DGPS data are retrieved from the second broadcaster, and the message is used to identify the DGPS data required to correct the uncorrected information. The uncorrected GPS data are correlated with the DGPS data and corrected.

32 Claims, 13 Drawing Sheets

GCA Sentence
(GPS Fix Data)

The GCA sentence contains the time, position, and fix related data. The sentence structure is shown below:

$GPGGA, 151924, 3723.454444,N,12202.269777,W, 2,09,1.9,-17.49,M,-25.67,M,1,0000*57

GCA Sentence Fields

| Field | Description |
|---|---|
| 1 | UTC of position fix in HHMMSS.SS format |
| 2 | Latitude in DD MM,MMMM format (0-7 decimal places) |
| 3 | Direction of latitude<br><br>N: North<br>S: South |
| 4 | Longitude in DDD MM,MMMM format (0-7 decimal places |
| 5 | Direction of longitude:<br><br>E: East<br>W: West |
| 6 | GPS Quality indicator<br>0: fix not valid<br>1: GPS fix<br>2: DGPS fix |
| 7 | Number of SVs in use, 00-12 |
| 8 | HDOP |
| 9 | Antenna height, MSL reference |
| 10 | 'M' indicates that the altitude is in meters. |
| 11 | Geoidal separation |
| 12 | 'M' indicates that the geoidal separation is in meters |
| 13 | Age of differential GPS data record, Type 1. Null when DGPS not used |
| 14 | Base station ID, 0000-1023 |

FIG. 5A

GLL Sentence
(Position Data)

The GLL sentence specifies the position fix, time of position fix, and status. The sentence structure is shown below:

$GPGLL, 3723.4543,N,12202.2696,W,151933,A*3E

GLL Sentence Fields

| Field | Description |
|---|---|
| 1 | Latitude in DD MM,MMMM format (0-7 decimal places ) |
| 2 | Direction of latitude<br><br>N:   North<br>S:   South |
| 3 | Longitude in DDD MM,MMMM format (0-7 decimal places) |
| 4 | Direction of longitude:<br><br>E:   East<br>W:   West |
| 5 | UTC of position in HHMMSS.SS format |
| 6 | Fixed text 'A' shows that data is valid |
| 7 | See RMC sentence |

FIG. 5B

GSA Sentence
(GPS DOP and Active Satellites)

The GPS sentence identifies the GPS position fix mode, the SVs used for navigation, and the DOP values. The sentence structure is shown below:

$GPGSA,A,3,19,28,14,18,27,22,31,29,,,,,1.7, 1.0,1.3*35

GSA Sentence Fields

| Field | Description |
|---|---|
| 1 | Mode<br><br>M: Manual, forced to operate in 2D or 3D<br>A: Automatic, 3D/2D |
| 2 | Mode<br><br>1: Fix not available<br>2: 2D<br>3: 3D |
| 3-14 | ID's of SVs used in position fix (null for unused fields) |
| 15 | PDOP |
| 16 | HDOP |
| 17 | VDOP |

FIG. 5C

RMC Sentence
(Recommended Minimum Specific GPS Data)

The RMC sentence identifies the UTC time, status, latitude, longitude, speed over ground (SOG), date, and magnetic variation of the position fix. The sentence structure is shown below:

$GPRMC, 184804.00,A, 3723.476543,N,12202.2397
45,W,000.0,0.0,051196,15.6,E*7C

RMC Sentence Fields

| Field | Description |
| --- | --- |
| 1 | Time: UTC time of the position fix in hhmmss.ss format |
| 2 | Status<br><br>A: Valid<br>V: Navigation Receiver Warning (V is output whenever the receiver suspects something is wrong) |
| 3 | Latitude coordinate (the number of decimal places, 0-7, is programmable and determined by the numeric precision selected in TSIP Talker for a RMC sentence) |
| 4 | Latitude direction: N = North, S = South |
| 5 | Longitude coordinate (the number of decimal spaces, 0-7, is programmable and determined by the numeric precision selected in TSIP Talker for a RMC sentence) |
| 6 | Longitude direction:<br><br>W: West<br>E: East |
| 7 | Speed Over Ground (SOG) in knots (0-3 decimal places) |
| 8 | Track Made Good, True, in degrees |
| 9 | Date in dd/mm/yy format |
| 10 | Magnetic Variation in degrees |
| 11 | Direction of magnetic variation<br><br>E: Easterly variation from True course (subtracts from True course)<br>W: Westerly variation from True course (Adds to True course) |
| 12 | Mode Indication<br><br>A: Autonomous<br>D: Differential<br>N: Data not valid |

FIG. 5D

PTNL,GGK Sentence
(Time, Position, Position Type and DOP Values)

The PTNL,GGK message string is shown below:

$PTNL,GGK, 172814.00,071296,3723.46587704,N,
12202.26957864,W,3,06,1.7,EHT-6.777,M*48

PTNL,GGK Sentence Fields

| # | Description |
|---|---|
| 1 | UTC of position fix in hhmmss.ss format |
| 2 | UTC Date of position, in mmddyy format |
| 3 | Latitude, in degrees and decimal minutes (e.g. dddmm.mmmmmmm) |
| 4 | Direction of latitude<br><br>N: North<br>S: South |
| 5 | Longitude, in degrees and decimal minutes (e.g. dddmm.mmmmmmm) |
| 6 | Direction of Longitude:<br><br>E: East<br>W: West |
| 7 | GPS Quality indicator:<br><br>0: fix not available or invalid<br>1: Autonomous GPS fix<br>4: Differential, code phase only solution (DGPS) |
| 8 | Number of satellites used in GPS solution |
| 9 | DOP of fix |
| 10 | Ellipsoidal height of fix (antenna height above ellipsoid) |
| 11 | M: Ellipsoidal height is measured in meters |

FIG. 5E

GNS Sentence

The GNS sentence provides fix data for GPS, GLONASS, possible future satellite systems, and systems combining these. The sentence structure is shown below:

$--GNS, hhmmss.ss, 1111.11, a, yyyyy.yy, a,
c--c, xx, x.x, x.x, x.x
x.x*hh<CR><LF>

GNS Sentence Fields

| Field | Description |
|---|---|
| 1 | UTC of position |
| 2 | Latitude |
| 3 | Latitude N/S flag |
| 4 | Longitude |
| 5 | Longitude E/W flag |
| 6 | Mode indicator for position (i.e., A = autonomous, D = differential, etc.) |
| 7 | Total number of satellites in use, 00-99 |
| 8 | HDOP |
| 9 | Antenna altitude, meters, re: mean-sea level (geoid) |
| 10 | Geoidal separation, meters |
| 11 | Age of differential data |
| 12 | Differential reference station ID |

FIG. 5F

POST-PROCESSING OF NMEA DATA

TECHNICAL FIELD

The present invention relates to the processing of data. In particular, the present invention pertains to a method and system thereof for post-processing Global Positioning System (GPS) data that are in the National Marine Electronics Association (NMEA) format.

BACKGROUND ART

The Global Positioning System (GPS) provides a worldwide navigation and positioning resource for military and civilian use. GPS is based on a constellation of satellites orbiting the earth that act as reference points from which receivers on the ground are able to determine their position. The satellites' orbits are accurately monitored. By measuring the time it takes for signals transmitted from a subset of the satellites to reach a receiver, the receiver can determine its distance from each satellite in the subset. Knowing the distance from each satellite, a roving (mobile) receiver can calculate its position, including its latitude, longitude, and course, for example.

Differential GPS (DGPS) is a method to improve the accuracy of GPS. DGPS works by canceling out the natural and man-made errors that are present in GPS measurements (for example, errors due to imperfect satellite orbits and satellite clocks, multipath reflection, atmospheric distortion, etc.). With DGPS, a second receiver (a reference station or a base station) is used in addition to the first, roving receiver. The base station is placed in a precisely measured and known location. The base station receives signals from each satellite, calculates its position based on the signals, and determines error by comparing the calculated position against the known position. The base station continuously calculates the error because the magnitude of the error can change (for example, because the positions of the satellites change). The base station calculates corrections and transmits them to the roving receiver, which then applies the corrections to its measurements to determine its position more accurately. Typically, the corrections are transmitted from the base station to the roving receiver via radio signals.

A problem with DGPS is that the radio signals from the base stations sometimes are blocked or encounter interference. For example, if the roving receiver passes under a power line, local interference caused by the power line can interrupt the radio signals. Thus, for a period of time, the roving receiver cannot receive correction information from the base station, and consequently the position measurements made by the roving receiver during this period cannot be accurately corrected.

This problem is particularly troublesome in applications where it is desirable, and even necessary, to create an accurate map of a particular area. For example, in agricultural applications, the roving GPS receiver may be coupled with a yield monitor that measures crop yields and other data as the crop is being harvested in a field. The GPS receiver and yield monitor are mounted on a harvesting combine and, as the farmer harvests the crops, yield and uncorrected position information are recorded by a computer system. Using the DGPS correction information, the receiver determines its corrected position in real time (as the position information and yield data are accumulated). The computer system then executes software that correlates the yield and corrected position data to create a map showing yield as a function of position in the field. Clearly, it is necessary to accurately measure position so that an accurate yield map can be made. However, when interference interrupts the radio signal from the base station, correction information cannot be received and used to correct the position measurements made by the roving receiver, and therefore portions of the yield map are inaccurate and unusable. It can be appreciated that accurate position information is desirable for similar types of maps, such as maps showing the distribution of fertilizer, pesticide, etc. It can be further appreciated that accurate position information is desirable for other applications outside of the agricultural applications discussed above, such as marine/hydrographic mapping.

Outside of agricultural applications, one prior art method for addressing the problem created by the interruption of the radio signal from the base station is to store the correction information at the base station, retrieve it later, and then subsequently apply it to the uncorrected information ("post-processing" versus real time processing). For agricultural applications (as well as for some other applications such as marine), NMEA provides a standard data format (e.g., NMEA sentences or NMEA strings) that can be understood by a computer system so that it can process GPS/DGPS information. Most agricultural software has adopted the NMEA format for storing GPS/DGPS information However, the NMEA standard has no provisions for storing data that are required for post-processing. This is problematic because, as described above, in some instances the GPS data cannot be corrected in real time. Thus, in these instances, either inaccurate position data or no data at all will be available to generate a yield map.

Accordingly, what is needed is a system or method to collect, in NMEA format, GPS/DGPS information required for post-processing. Furthermore, what is needed is a system or method that post-processes the NMEA data and can be used with software that generates, for example, a yield map or similar types of maps. The present invention provides a novel solution to these needs.

DISCLOSURE OF THE INVENTION

The present invention provides a method and system thereof that corrects Global Positioning System (GPS) data when Differential GPS (DGPS) correction information cannot be received from a GPS base station in real time. The present invention provides a method and system thereof that can be used with GPS data that are formatted according to the National Marine Electronics Association (NMEA) specifications. Furthermore, the present invention provides a method and system thereof that can be used with the software (current and foreseen) that is used to generate, for example, a yield map or similar types of maps. In other embodiments, the present invention can be applied to other satellite navigation systems, including GLONASS and LORAN-C, for example. The present invention can also be used for non-navigation applications.

The present invention provides a method and system thereof for processing data, including GPS data in the NMEA format. In the GPS embodiment, uncorrected GPS data indicating an estimated position are computed by a receiver via signals from a first broadcaster (e.g., GPS satellites). DGPS data are received by the receiver via a signal from a second broadcaster (e.g., a GPS base station). In the present embodiment, a message is generated by the receiver when, for example, the signal from the second broadcaster is not received. The message contains information that is sufficient to identify the DGPS data stored by the second broadcaster that are needed to correct the uncorrected GPS data.

In one GPS embodiment, the information in the message comprises a time tag for the estimated position fix and, for each GPS satellite used in the position calculation at the same time tag, an identifier tag and IODE (issue of data ephemeris) information.

In one GPS embodiment, the message and the uncorrected GPS data are stored by the receiver for subsequent processing (e.g., post-processing). Alternatively, the message and uncorrected GPS data are stored in an external memory device. The DGPS data are retrieved from the second broadcaster, and the information in the message is used to identify the DGPS data needed to correct the uncorrected information. The uncorrected GPS data are correlated with the DGPS data using time tags, for example, and corrected.

In the present embodiment of the present invention, the GPS data are formatted in the NMEA format, in particular using NMEA sentences such as the GGA sentence, the GSA sentence, the GNS sentence, the GLL sentence, and the RMC sentence. A custom message, such as the proprietary PTNL, GGK sentence, can also be used. In addition, any third party proprietary NMEA messages or NMEA-2000 messages containing equivalent data could be used. In this embodiment, any estimated positions contained in NMEA sentences are replaced with the corrected positions. Thus, the present invention can be used to post-process NMEA data and can be used with software that is based on NMEA sentences.

In another GPS embodiment, the steps of retrieving the DGPS data from the second broadcaster, using the message to identify the DGPS data needed, and using the identified DGPS data to correct the uncorrected GPS data are performed substantially in real time.

In accordance with the present embodiment of the present invention, the corrected GPS data can be used to generate a map correlating agricultural data (for example, crop yield data) to the corrected positions on the map. In addition, the corrected GPS data can be used to generate similar types of maps for other applications.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 5A, 5B, 5C, 5D, 5E and 5F provide exemplary embodiments of NMEA sentences in accordance with the present invention.

BEST MODE FOR CARRYING OUT THE INVENTION

Figure 1:
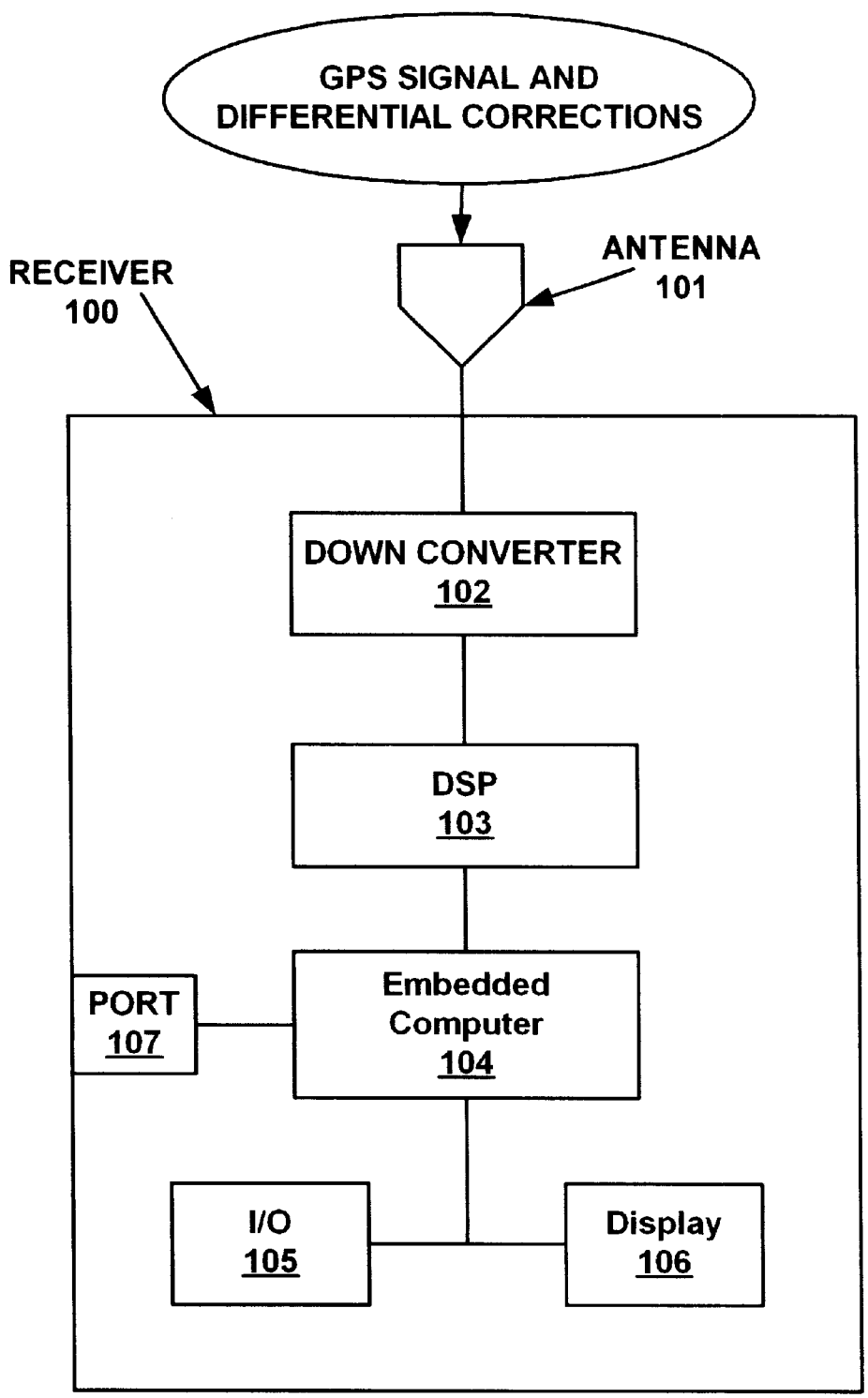
FIG. 1 is a block diagram of an exemplary Global Positioning System (GPS) receiver in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "receiving" or "using" or "replacing" or "correlating" the like, refer to the action and processes of a computer system (e.g., the processes of FIGS. 6, 7 and 8), or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed in the context of the Global Positioning System (GPS), including Differential GPS (DGPS), to avoid unnecessarily obscuring aspects of the present invention. However, it is appreciated that the present invention is suited for any differential correction provider that may be used in navigation and positioning receivers, such as WAAS (wide area augmentation system). The present invention can be applied to other satellite navigation systems, including GLONASS and LORAN-C, for example. The present invention can also be used for non-navigation applications.

FIG. 1 is a block diagram of an exemplary GPS receiver 100 in accordance with one embodiment of the present invention. Receiver 100 can be a mobile (roving) receiver; as such, it can be mounted on a vehicle (e.g., farm equipment, such as a harvesting combine). Receiver 100 also exemplifies a base station (reference station) receiver that is fixed in a relatively permanent position and generates DGPS corrections for broadcast, storage, or both.

In the present embodiment, receiver 100 includes sufficient computational resources (e.g., embedded computer 104) to host the software which implements the features and functions of the present invention. Alternatively, receiver 100 can be coupled to a computer system (see FIG. 3) via port 107; in this alternative embodiment, the computer system hosts the software which implements the features and functions of the present invention, and data are downloaded from receiver 100 to the computer system for processing.

Receiver 100 receives GPS signals from one or more GPS satellites via antenna 101. Antenna 101 can also be used to receive information broadcast by a base station. Alternatively, separate antennas and/or receivers may be used to process the GPS and DGPS signals while communicating with each other via port 107, or via a cabled or wireless data link. Port 107 can represent a serial port, parallel port, CAN bus port, USB (universal serial bus) port, or the like.

The GPS signals are converted by down converter 102, despread and demodulated by digital signal processor (DSP) 103, and passed to an internal embedded computer 104, which determines the uncorrected GPS-based position. Information (such as present position) can be communicated to the user via an optional display device 106 coupled to embedded computer 104. Receiver 100 can be configured using an optional user input/output (I/O) device 105 (e.g., a keyboard, a push button panel, or the like).

In accordance with the present embodiment of the present invention, once received, the GPS-related data are formatted according to National Marine Electronics Association (NMEA) specifications; in one embodiment, the NMEA-0183 format is used, although it is appreciated that NMEA-2000 or other NMEA formats or equivalents, currently in use or envisioned, may be used. NMEA provides a standard data format for GPS data that can be understood by a computer system (e.g., embedded computer 104 of FIG. 1 or computer system 390 of FIG. 3) so that it can process GPS/DGPS information. The NMEA format uses known NMEA sentences (also referred to as NMEA strings). Each NMEA sentence includes a sentence identifier to distinguish one NMEA sentence from another NMEA sentence. The data included in a NMEA sentence are placed in fields. A NMEA sentence contains several fields separated by commas. Additional information is provided in conjunction with FIGS. 5A through 5F.

Figure 2:
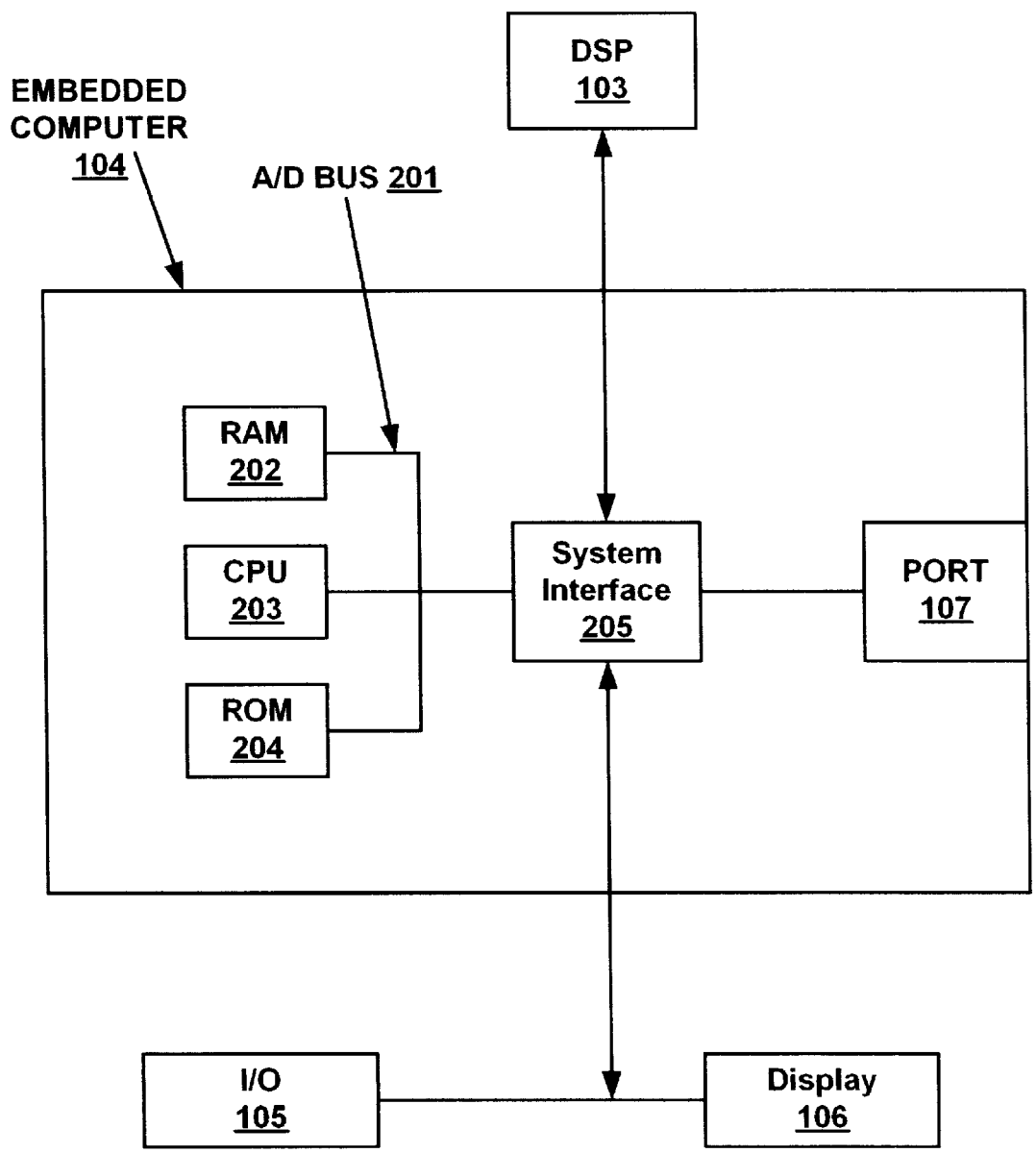
FIG. 2 is a block diagram of an exemplary embedded computer used by the GPS receiver of FIG. 1 and upon which embodiments of the present invention may be practiced.

FIG. 2 is a more detailed block diagram of an exemplary embedded computer 104 upon which embodiments of the present invention may be practiced. Embedded computer 104 includes address/data (A/D) bus 201 for communicating information, one or more central processor units (CPUs) 203 coupled with A/D bus 201 for processing information and instructions, a volatile memory (e.g., a random access memory, RAM) 202 coupled with A/D bus 201, and a non-volatile memory (e.g., read only memory, ROM) 204 coupled with A/D bus 201 for storing static information and instructions for CPU 203. Also included in embedded computer 104 is a system interface unit 205 that is coupled with port 107, DSP 103, I/O device 105 and display device 106.

Figure 3:
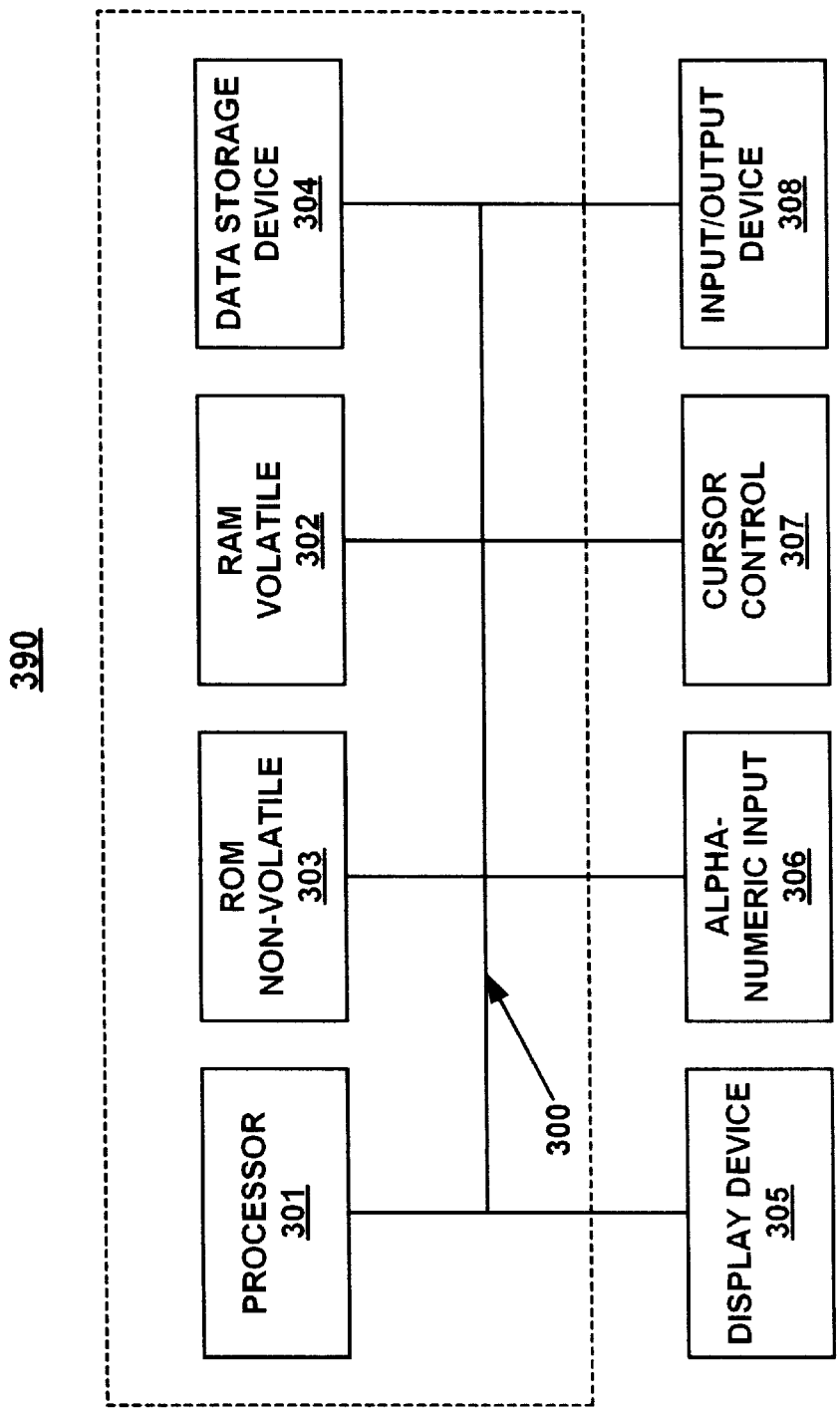
FIG. 3 is a block diagram of an exemplary computer system upon which embodiments of the present invention may be practiced.

FIG. 3 illustrates an exemplary computer system 390 upon which embodiments of the present invention may be practiced. In general, computer system 390 comprises A/D bus 300 for communicating information, processor 301 coupled with A/D bus 300 for processing information and instructions, random access (volatile) memory 302 coupled with A/D bus 300 for storing information and instructions for processor 301, read-only (non-volatile) memory 303 coupled with A/D bus 300 for storing static information and instructions for processor 301, data storage device 304 such as a magnetic or optical disk and disk drive coupled with A/D bus 300 for storing information and instructions, an optional user output device such as display device 305 coupled to A/D bus 300 for displaying information to the computer user, an optional user input device such as alphanumeric input device 306 including alphanumeric and function keys coupled to AND bus 300 for communicating information and command selections to processor 301, and an optional user input device such as cursor control device 307 coupled to AND bus 300 for communicating user input information and command selections to processor 301. Furthermore, an input/output (I/O) device 308 is used to couple computer system 390 to, for example, port 107 of receiver 100 (FIG. 1).

Figure 4:
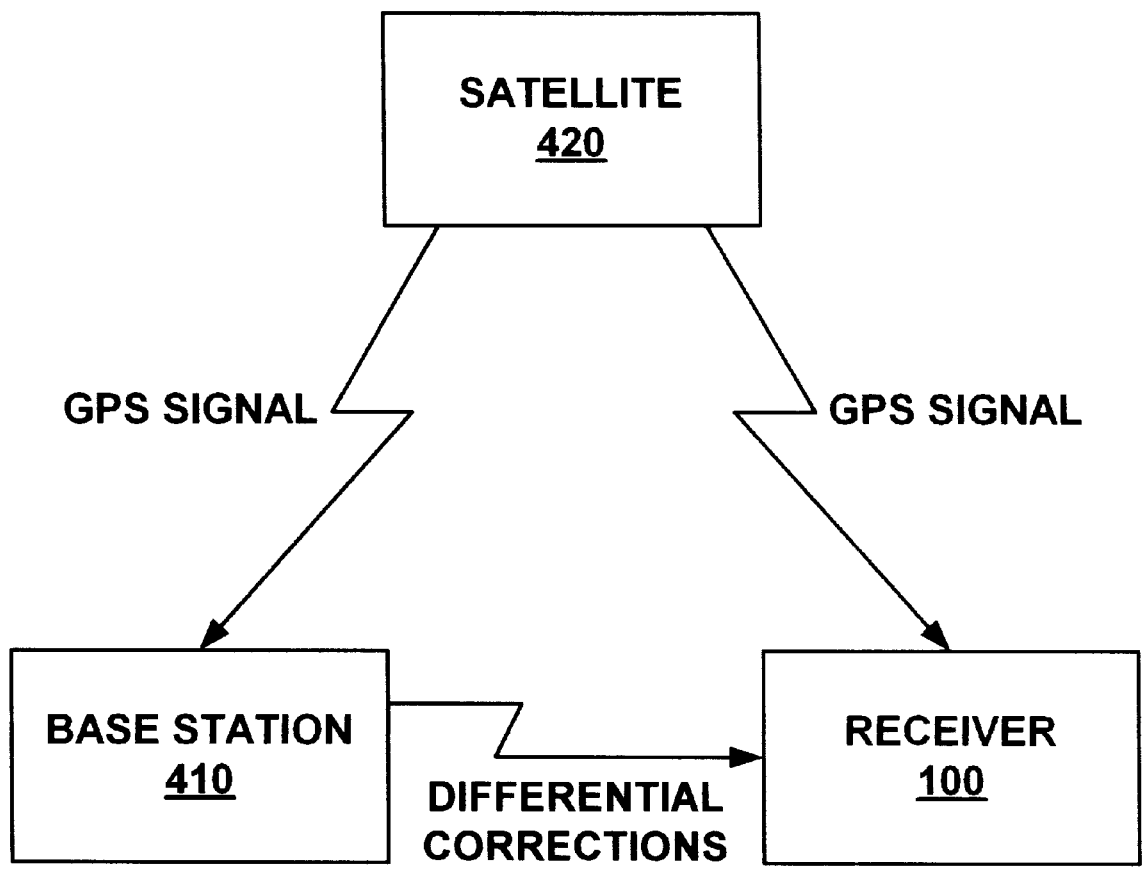
FIG. 4 shows a receiver, base station, and satellite used in Differential GPS in accordance with one embodiment of the present invention.

FIG. 4 shows receiver 100, base station 410, and satellite 420 that are used in DGPS in accordance with one embodiment of the present invention. It is appreciated that satellite 420 is one of a multiplicity of GPS/DGPS satellites, and that more than one satellite may be used by receiver 100 to generate position fixes. For simplicity of discussion, the present invention is discussed in the context of the use of a single satellite; however, one of ordinary skill in the art will be able to extrapolate the discussion to the use of a plurality of satellites.

GPS works in a known fashion to provide position information to receiver 100 and base station 410. Satellite 420 broadcasts GPS signals which are picked up by receiver 100. Based on the information in the GPS signal, receiver 100 determines its uncorrected position ("autonomous GPS") (that is, a position fix that is not yet corrected for natural and man-made errors such as imperfect satellite orbit and satellite clock, multipath reflections, atmospheric distortion, etc.).

DGPS works, also in a known fashion, to improve the accuracy of GPS. With DGPS, base station 410 is placed in a precisely measured and known location. Base station 410 also receives GPS signals from satellite 420, calculates its position based on the signals, and determines error by comparing the calculated position against the known position. Base station 410 continuously calculates the amount of error, calculates corrections, and broadcasts the corrections, typically using a radio signal at an established frequency. Base station 410 also stores the DGPS correction information so that it can be subsequently retrieved.

Receiver 100 is tuned to the frequency used by base station 410 and so is able to receive the correction information essentially in real time (except when the signal from base station 410 is interrupted due to interference, signal obscuration, malfunction, or some other reason). In the present embodiment, receiver 100 (in particular, embedded computer 104 of FIG. 1) has the capability to compute a DGPS-corrected position using the correction information received from base station 410. In the present embodiment, the correction information broadcast from base station 410 is applied in real time to compute the corrected position; that is, the corrected position is determined by receiver 100 at substantially the same time that it receives the GPS signal from satellite 420 and the DGPS correction information from base station 410.

Continuing with reference to FIG. 4, in those instances when the correction data from base station 410 cannot be received by receiver 100 (due to interference, obscuration, malfunction, etc.), in accordance with the present embodiment of the present invention, receiver 100 generates a message that contains particular information derived from the signal received by receiver 100 from satellite 420. The message (also referred to herein as a "supplementary message") contains supplemental information ("metadata") required for post-processing NMEA data. The particular information contained in the message is sufficient supplemental information (e.g., metadata) to allow the NMEA data to be post-processed at a later time with correction data saved for the same time period. The supplementary message is generated by receiver 100 for each position fix computed by receiver 100.

In the present embodiment, a supplementary message is generated and used only when the correction information from base station 410 is interrupted or is otherwise unavailable to receiver 100. However, in another embodiment, a supplementary message can be continuously generated or nearly continuously generated, even if the signal from base station 410 is received. Alternatively, a supplementary message can be generated even if the signal from base station 410 could be received, but for some reason a user elects not to receive the signal.

In the present embodiment of the present invention, the supplementary message(s) generated by receiver 100 include the following information (metadata): the time tag for the position fix and, for each of the satellites used for the position fix, the unique identifier(s) and the IODE (issue of data ephemeris) that were used in the position fix calculation at the same time tag. IODE is a term known in the art and refers to the set of model parameters that were used to calculate a satellite's orbit over a given time period. A supplementary message thus includes information about which sets of ephemerides for the satellites was used by receiver 100 to determine a position fix. It is appreciated that, in accordance with the present invention, the supplementary message can contain other information.

The information contained in the supplementary message(s) is used to identify the DGPS correction information stored by base station 410 needed to correct the uncorrected position information. The DGPS correction information stored at base station 410 can be retrieved via an Internet connection, access to a file on a server computer system, using a removable memory device (e.g., a magnetic or optical disk), or the like. Using the time tags and the IODEs for each satellite contained in the supplementary message(s), the appropriate correction information can be identified for the same set of ephemeris. That is, the metadata in the supplementary message(s) are used to properly identify the right set of correction information stored by base station 410. In one embodiment, the correction information so identified is then used to post-process the uncorrected position information stored by receiver 100. In another embodiment, the correction information so identified is used to process the uncorrected position information substantially in real time. Additional information is provided in conjunction with FIGS. 6, 7 and 8.

FIGS. 5A through 5F present exemplary NMEA sentences used in accordance with one embodiment of the present invention. In the present embodiment, the following combinations of NMEA sentences can be used with the supplementary message generated by receiver 100:

GGA and GSA;

GNS and GSA; and/or

PTNL, GGK and GSA.

In the present embodiment, the following combinations of NMEA sentences can also be used with the supplementary message generated by receiver 100 by adding a DGPS status indicator:

GLL and GSA; and/or

RMC and GSA.

The DGPS status indicator is used to indicate whether position information in a data set has been corrected. For example, data not yet corrected using the real-time DGPS correction information would be marked by a flag, and data that has been corrected would not be.

In one embodiment, the GSA sentence is not used in combination with another NMEA sentence because the supplementary message generated by receiver 100 already contains the identifier(s) of the satellite(s) that were used to compute the GPS position. It is appreciated that, in accordance with the present invention, other NMEA sentences or combinations of sentences can be used with the message generated by receiver 100 and the stored base station corrections for the same time period in order to correct position information after the fact. This includes third party proprietary NMEA messages and NMEA-2000 messages that contain data equivalent to those mentioned in FIGS. 5A through 5F.

Figure 6:
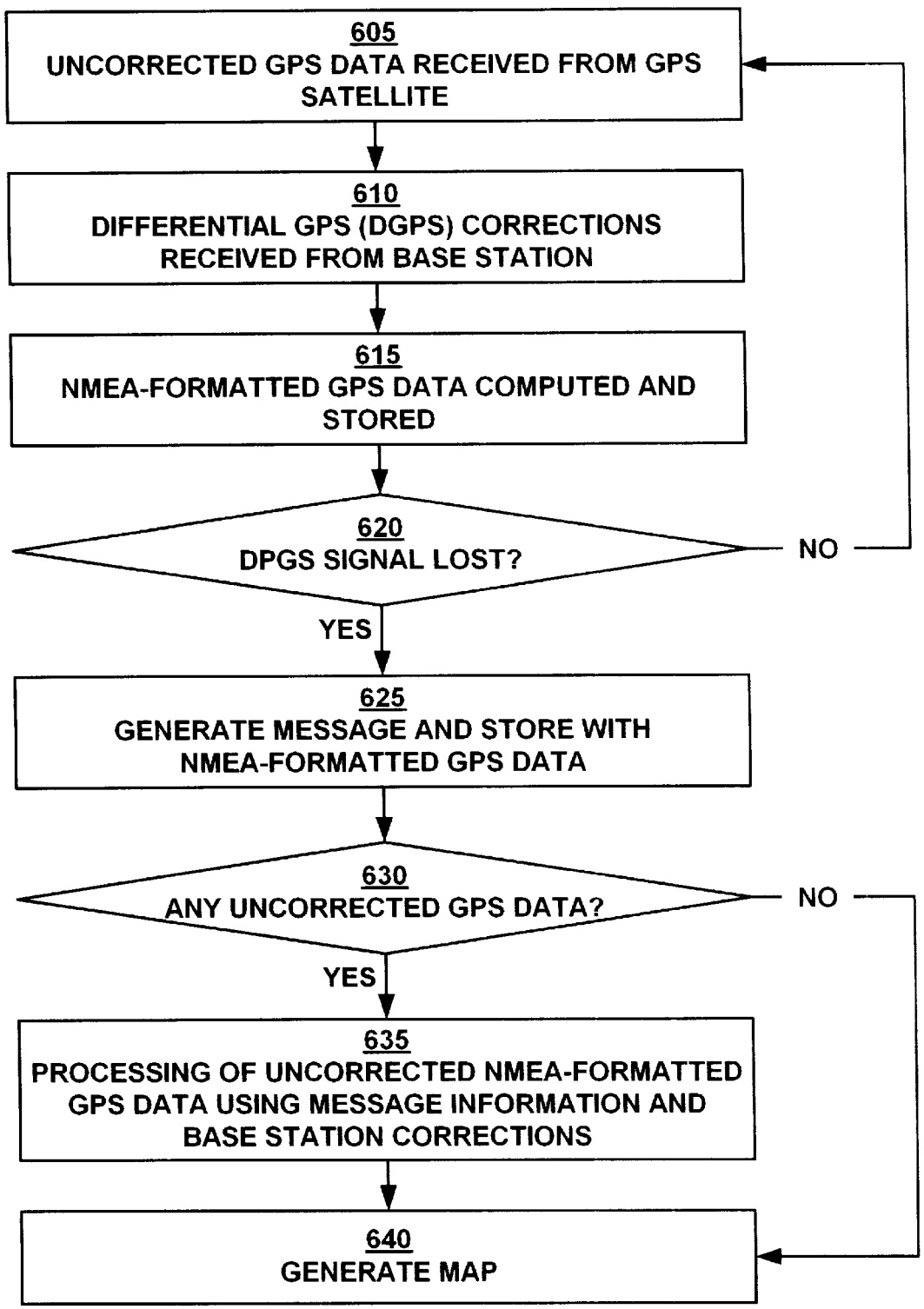
FIG. 6 is a flowchart of the steps used for correcting GPS data in accordance with one embodiment of the present invention.

FIG. 6 is a flowchart of the steps in a process 600 for processing GPS data (specifically, NMEA-formatted data) in accordance with one embodiment of the present invention. In one embodiment, process 600 is implemented via computer-readable program instructions stored in a memory unit (e.g., random access memory 202 and/or read-only memory 204) and executed by CPU 203 of embedded computer 104 (FIG. 2) in receiver 100 (FIG. 1). In another embodiment, process 600 is implemented via computer-readable program instructions stored in a memory unit (e.g., random access memory 302, read-only memory 303, and/or data storage device 304) and executed by processor 301 of computer system 390 (FIG. 3).

In step 605 of FIG. 6, signals are received by a receiver (e.g., receiver 100 of FIG. 4) from a GPS satellite (e.g., satellite 420 of FIG. 4). In the present embodiment, the signals are used by receiver 100 to compute a position fix, and the fix data are then formatted according to the NMEA standard format (a NMEA sentence such as those exemplified by FIGS. 5A–5F). The NMEA sentence has a time tag associated with it, either directly within the sentence itself or by association with another NMEA sentence that has a time tag. The GPS information received in this step represents uncorrected position information.

In step 610 of FIG. 6, DGPS data are received by receiver 100 from a base station (e.g., base station 410 of FIG. 4) in real time, except when the signal from base station 410 is interrupted and cannot be received. The DGPS data from base station 410 is also time-tagged. The DGPS information received in this step represents correction information that can be used to correct in real time the uncorrected position information from step 605.

In step 615 of FIG. 6, the NMEA-formatted GPS data are stored by receiver 100 (e.g., in RAM 202 of FIG. 2). Alternatively, these data are stored in an external memory device. In the case in which DGPS data are received from base station 410, the time tags can be used to correlate the uncorrected position information from step 605 with the correction information from step 610. Using known techniques, a corrected position can be calculated in real time (that is, as the uncorrected position information and the correction information are received by receiver 100).

In step 620 of FIG. 6, when the signal from base station 410 is not received by receiver 100, receiver 100 will continue to compute uncorrected position information based on signals from satellite 420 but will not receive corresponding correction information from base station 410. Receiver 100 can readily detect the loss of signal from base station 410 and/or the absence in the stored data of correction information.

In step 625, in the present embodiment, when receiver 100 detects that correction data are not being received from base station 410, it automatically generates a message (e.g., a supplementary message, see discussion pertaining to FIG. 4). In this embodiment, when the signal from base station 410 is reacquired, the generation of the message is stopped. Thus, in the present embodiment, a message is generated by receiver 100 and used only when the correction information from base station 410 is interrupted or is otherwise unavailable to receiver 100. However, in another embodiment, a message can be continuously generated or nearly continuously generated, even if the signal from base station 410 is received. Alternatively, a message can be generated even if the signal from base station 410 could be received, but for some reason a user elects not to receive the signal.

In step 630, if there is not any uncorrected position information (because the signal from base station 410 was continuously received), then no further processing of the position information is needed. As described above, when correction information from base station 410 is available, the position information is corrected in real time.

In step 635, in the present embodiment, processing of the NMEA-formatted uncorrected position information occurs in order to determine corrected position information. The processing is based on the supplementary message information (e.g., metadata) and the uncorrected GPS information stored by receiver 100 (from step 625), and the DGPS correction information stored by base station 410. In one embodiment, the processing is performed using the computational resources of receiver 100. In another embodiment, the uncorrected position information, the supplementary message information, and the DGPS correction information are downloaded from receiver 100 to a separate computer system (e.g., computer system 390 of FIG. 3), which performs the processing.

In one embodiment, the processing of the NMEA-formatted uncorrected position data occurs at some time subsequent to the time interval(s) in which the uncorrected GPS data are collected (e.g., post-processing). In another embodiment, the processing of the NMEA-formatted uncorrected position data occurs substantially in real time while the uncorrected GPS data are collected (or shortly thereafter). Additional information regarding post-processing is provided in conjunction with FIG. 7. Additional information regarding the real time correction is provided in conjunction with FIG. 8.

In step 640 of FIG. 6, the corrected position is correlated with the yield data or other data of interest, and a map is generated. As the position information is being accumulated as described above, other information can be recorded by a device peripheral to and coupled with receiver 100. For example, in an agricultural application, a yield monitor can be coupled to receiver 100. The yield monitor records crop yield data as a function of position in the field. The yield data are correlated with the position information using, for example, a time tag. After the corrected position information has been calculated, an accurate map of yield data as a function of corrected position can be generated using a software package compatible with the NMEA format. It is appreciated that other types of peripheral devices can be coupled to receiver 100 in order to record data of interest (for example, pesticide or fertilizer distribution) as a function of position. It is also appreciated that information may be gathered for applications other than agriculture.

Figure 7:
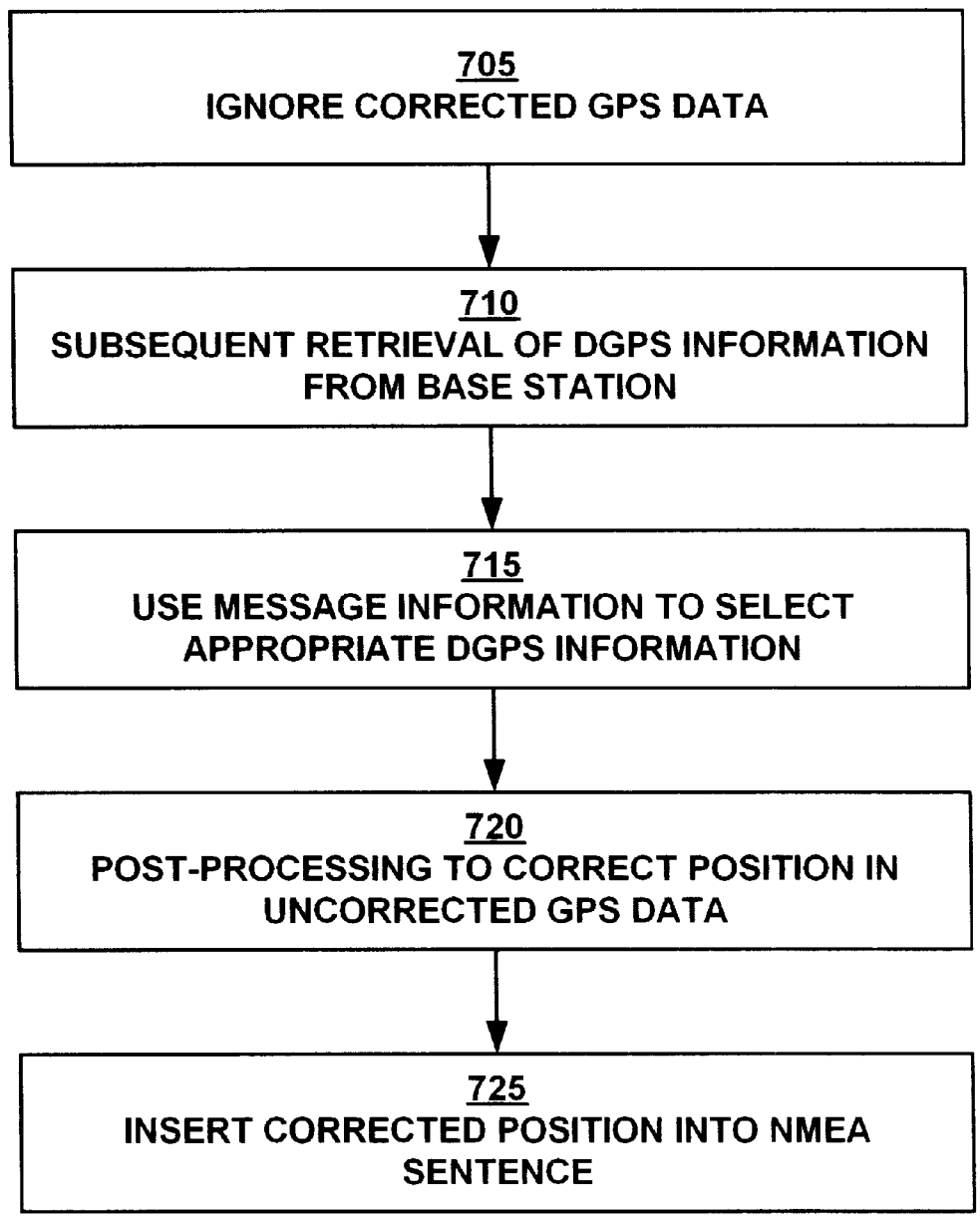
FIG. 7 is a flowchart of the steps used for post-processing GPS data in accordance with one embodiment of the present invention.

FIG. 7 provides additional information with regard to the post-processing of the uncorrected NMEA-formatted GPS data (step 635 of FIG. 6). As indicated previously, in one embodiment, post-processing is implemented in receiver 100 (FIG. 1). In another embodiment, post-processing is implemented in computer system 390 (FIG. 3).

In step 705 of FIG. 7, in the present embodiment of the present invention, the corrected position information (that is, the position information that was corrected in real time) is ignored. When a message (generated in step 625 of FIG. 6) is detected, the information in the message is read and post-processing of any uncorrected position information is initiated.

In step 710 of FIG. 7, in the present embodiment, the DGPS information stored at base station 410 is retrieved. The DGPS correction information stored at base station 410 can be retrieved via an Internet connection, access to a file on a server computer system, using a removable memory device (e.g., a magnetic or optical disk), or the like. In this embodiment, the DGPS correction information is retrieved at some time after the uncorrected GPS information has been collected. For example, in an agricultural application, receiver 100 may be mounted on a harvesting combine. After the harvesting is completed, the user returns to his/her home or office and retrieves the DGPS correction information from base station 410.

In step 715, in the present embodiment, the information in the message (metadata) is used to select the appropriate DGPS correction information required to correct the uncorrected position information stored by receiver 100. That is, the metadata in the message are used to properly identify the right set of correction information out of all of the correction information retrieved from base station 410. In the present embodiment, the message contains, for each satellite being used by receiver 100, the satellite identifier and the IODE for satellite 420 as well as a time tag indicating the position fix that was computed using these satellites and IODEs. Using the set of ephemeris for each satellite and the time tag contained in the message, the appropriate correction information for the same set of satellites and ephemeris can be identified.

In an alternate embodiment, before the DGPS data are retrieved from base station 410, the information in the message is used to identify the DGPS correction information required to correct the uncorrected position information stored by receiver 100. In this embodiment, only the DGPS information so identified is retrieved from base station 410.

In step 720 of FIG. 7, using the selected correction information from steps 710 and 715, post-processing is performed to correct the uncorrected position information. The correction of the uncorrected position information is performed using a known technique.

In step 725, the corrected position is inserted into the NMEA-formatted GPS data (the NMEA sentence) in place of the uncorrected position that was previously in the NMEA sentence. From the perspective of the hardware or software that is reading the NMEA sentence, in accordance with the present invention, the format of the sentence is not changed. Thus, in accordance with the present invention, software that uses the NMEA string (e.g., a map generator) remains compatible.

Figure 8:
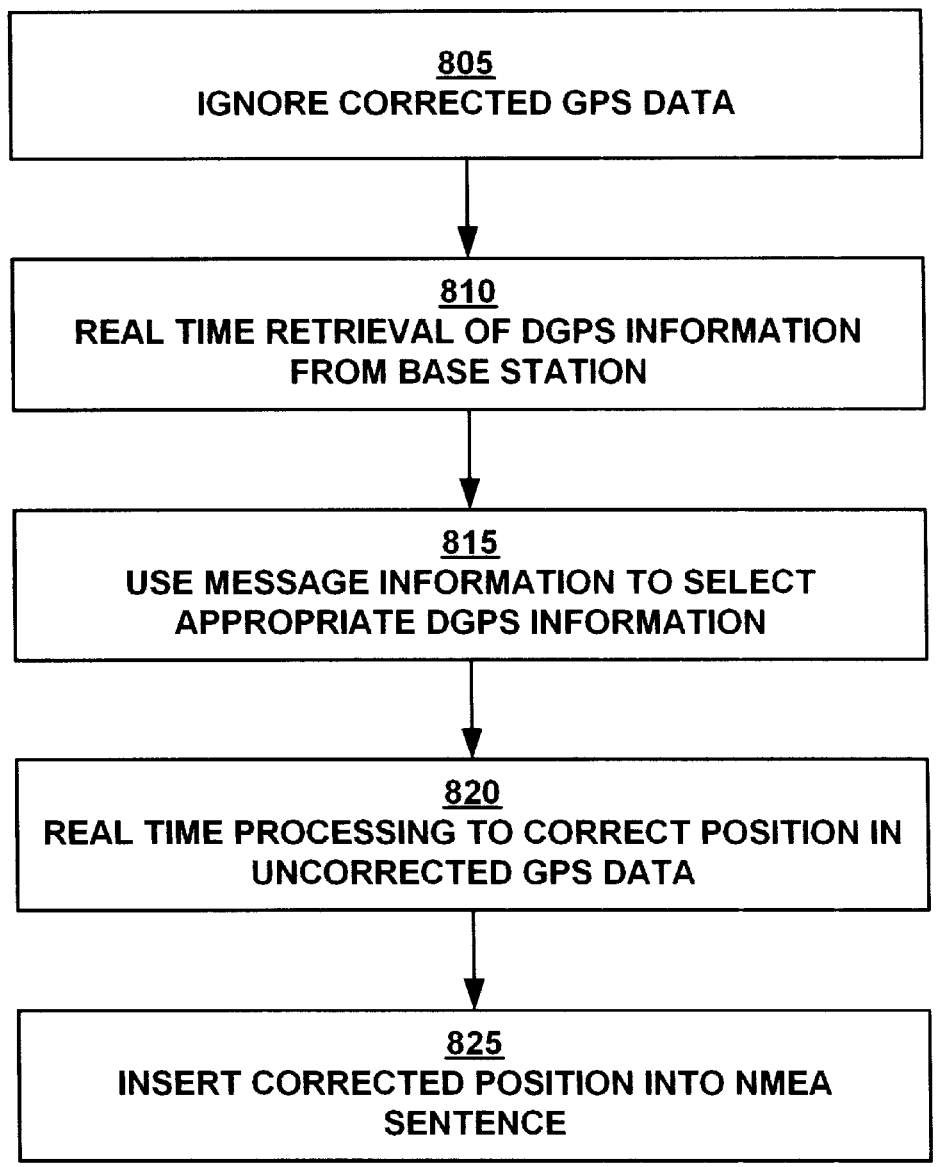
FIG. 8 is a flowchart of the steps used for processing GPS data substantially in real time in accordance with one embodiment of the present invention.

FIG. 8 provides additional information with regard to the substantially real time processing of the uncorrected NMEA-formatted GPS data (step 635 of FIG. 6). As indicated previously, in one embodiment, the processing is implemented in receiver 100 (FIG. 1). In another embodiment, the processing is implemented in computer system 390 (FIG. 3).

In step 805 of FIG. 8, in the present embodiment of the present invention, the corrected position information (that is, the position information that was corrected in real time) is ignored. When a message (generated in step 625 of FIG. 6) is detected, the information in the message is read and real time processing of any uncorrected position information is initiated.

In step 810 of FIG. 8, in the present embodiment, the DGPS information stored at base station 410 is retrieved. The DGPS correction information stored at base station 410 can be retrieved via a wireless Internet connection or the like. Embodiments of a wireless connection are described by U.S. Pat. No. 5,928,306 by Peter France and Paul Perrault, herein incorporated by reference in its entirety; however, it is appreciated that embodiments other than those described by the reference may be used.

In the present embodiment, the DGPS correction information is retrieved substantially in real time as the uncorrected GPS information is being collected. For example, in an agricultural application, receiver 100 may be mounted on a harvesting combine. When the supplementary message is generated, or when the broadcast signal from base station 410 is not received, a wireless Internet connection is made from receiver 100 to broadcast station 410 in order to retrieve the DGPS correction information, substantially in real time.

In step 815, in the present embodiment, the information in the supplementary message (metadata) is used to select the appropriate DGPS correction information required to correct the uncorrected position information stored by receiver 100. That is, the metadata in the message are used to properly identify the right set of correction information out of all of the correction information retrieved from base station 410 via the wireless connection. In an alternate embodiment, before the DGPS data are retrieved from base station 410 via the wireless connection, the information in the supplementary message is used to identify the DGPS correction information required to correct the uncorrected position information stored by receiver 100. In this embodiment, only the DGPS information so identified is retrieved from base station 410.

In step 820 of FIG. 8, using the selected correction information from steps 810 and 815, processing is performed to correct the uncorrected position information substantially in real time. The correction of the uncorrected position information is performed using a known technique.

In step 825, the corrected position is inserted into the NMEA-formatted GPS data (the NMEA sentence) in place of the uncorrected position that was previously in the NMEA sentence.

In summary, in accordance with the present embodiment of the present invention, a supplementary message is generated that is used as the basis for processing and correcting uncorrected position information, including position information in the NMEA format, using either the computational resources of a GPS receiver or a separate computer system. In the present embodiment, using the information in the supplementary message (e.g., metadata), the present invention retrieves the appropriate correction information from a base station, uses this information to correct uncorrected position information, and replaces the uncorrected position information in a NMEA sentence with the corrected information. Thus, the present invention is compatible with software that is based on the NMEA format.

In other embodiments, the present invention can be applied to other satellite navigation systems, including GLONASS and LORAN-C, for example. In one embodiment, the present invention can be used for non-navigation applications that involve generating a first set of data supporting the determination of a value of interest with a first degree of accuracy and generating a message containing information sufficient to identify, from a second set of data, additional data that in combination with the first set of data, or in combination with the first set of data and the information in the message, support the determination of the value of interest with a second degree of accuracy higher than the first degree of accuracy. In another embodiment, the present invention can be used for applications that involve generating a first set of data and a second set of data each supporting the determination of a value of interest, and identifying information from one or both of the databases that when properly combined yields information not contained in either database by itself. In one more embodiment, the present invention can be used for applications that involve generating a first set of data and a second set of data each supporting the determination of a value of interest, and generating a message containing supplementary information (e.g., metadata) identifying information from one or both of the databases that when properly combined, or combined with the metadata, yields information not contained in either database by itself.

The preferred embodiment of the present invention, processing of NMEA data, is thus described. While the present invention has been described in particular embodiments, it should be appreciated that the present invention should not be construed as limited by such embodiments, but rather construed according to the following claims.

What is claimed is:

1. A method for processing Global Positioning System (GPS) data, said method comprising the steps of:
    a) receiving uncorrected GPS data indicating an estimated position; and
    b) generating a message comprising information sufficient to identify differential GPS (DGPS) data needed to correct said uncorrected GPS data, wherein said message is generated in lieu of receiving said DGPS data and wherein said message comprises a time tag corresponding to said estimated position, an identifier tag identifying a first broadcaster that is a source of said GPS data, and IODE (issue of data ephemeris) information.

2. The method for processing GPS data as recited in claim 1 further comprising the step of:
    c) using said message to select DGPS data needed to correct said uncorrected GPS data.

3. The method for processing GPS data as recited in claim 2 further comprising the step of:

d) generating corrected GPS data using said DGPS data needed to correct said uncorrected GPS data, wherein said corrected GPS data indicate a corrected position.

4. The method for processing GPS data as recited in claim 3 wherein said step d) further comprises:

correlating said information in said message with said uncorrected GPS data using a time tag in said message and a time tag in said uncorrected GPS data.

5. The method for processing GPS data as recited in claim 3 wherein said steps b) through d) are performed in real time substantially as said uncorrected GPS data and said DGPS data are received.

6. The method for processing GPS data as recited in claim 3 wherein said uncorrected GPS data and said corrected GPS data are substantially compliant with a National Marine Electronics Association (NMEA) format.

7. The method for processing GPS data as recited in claim 6 wherein said uncorrected GPS data and said corrected GPS data are substantially equivalent to data contained in a NMEA sentence selected from a group consisting of: a GGA sentence, a GSA sentence, a GNS sentence, a GLL sentence, a PTNL,GGK sentence, and a RMC sentence.

8. The method for processing GPS data as recited in claim 7 further comprising the step of:

replacing in a NMEA sentence said estimated position with said corrected position.

9. The method for processing GPS data as recited in claim 1 wherein said DGPS data are received from a second broadcaster.

10. The method for processing GPS data as recited in claim 9 wherein said first broadcaster is a GPS satellite and said second broadcaster is a GPS base station.

11. The method for processing GPS data as recited in claim 1 further comprising the step of:

correlating agricultural data to said corrected position.

12. A method for processing Global Positioning System (GPS) data, said method comprising the steps of:

a) receiving uncorrected GPS data in a signal from a first broadcaster, said uncorrected GPS data indicating an estimated position;

b) receiving differential GPS (DGPS) data in a signal from a second broadcaster, said DGPS data used for correcting said estimated position when said signal from said second broadcaster is available, said correcting using said DGPS data performed substantially as said uncorrected GPS data and said DGPS data are received;

c) generating a message when said signal from said second broadcaster is not received, said message containing information sufficient to identify DGPS data needed to correct said uncorrected GPS data;

d) using said message to select DGPS data needed to correct said uncorrected GPS data;

e) generating corrected GPS data using said DGPS data needed to correct said uncorrected GPS data, wherein said corrected GPS data indicate a corrected position; and f) replacing in a National Marine Electronics Association (NMEA) sentence said estimated position with said corrected position.

13. The method for processing GPS data as recited in claim 12 wherein said steps c) through e) are performed in real time substantially as said uncorrected GPS data and said DGPS data needed to correct said uncorrected GPS data are received.

14. The method for processing GPS data as recited in claim 12 wherein said uncorrected GPS data and said corrected GPS data are substantially compliant with a NMEA format.

15. The method for processing GPS data as recited in claim 14 wherein said uncorrected GPS data and said corrected GPS data are substantially equivalent to data contained in a NMEA sentence selected from a group consisting of: a GGA sentence, a GSA sentence, a GNS sentence, a GLL sentence, a PTNL,GGK sentence, and a RMC sentence.

16. The method for processing GPS data as recited in claim 12 wherein said first broadcaster is a GPS satellite and said second broadcaster is a GPS base station.

17. The method for processing GPS data as recited in claim 12 wherein said information in said message comprises a time tag corresponding to said estimated position when said signal from said second broadcaster is not received, an identifier tag that identifies said first broadcaster, and IODE (issue of data ephemeris) information.

18. The method for processing GPS data as recited in claim 12 wherein said step e) further comprises:

correlating said information in said message with said uncorrected GPS data using a time tag in said message and a time tag in said uncorrected GPS data.

19. The method for processing GPS data as recited in claim 12 further comprising the step of:

correlating agricultural data to said corrected position.

20. A computer system comprising:

an address/data bus;

a computer-readable memory unit coupled to said address/data bus;

a processor coupled to said address/data bus, said processor for performing a method of processing Global Positioning System (GPS) data, said method comprising the steps of:

a) receiving uncorrected GPS data indicating an estimated position; and b) generating a message comprising information sufficient to identify differential GPS (DGPS) data needed to correct said uncorrected GPS data, wherein said message is generated in lieu of receiving said DGPS data and wherein said message comprises a time tag corresponding to said estimated position, an identifier tag identifying a first broadcaster that is a source of said GPS data, and IODE (issue of data ephemeris) information.

21. The computer system of claim 20 wherein said method further comprises the step of:

c) using said message to select DGPS data needed to correct said uncorrected GPS data.

22. The computer system of claim 21 wherein said method further comprises the step of:

d) generating corrected GPS data using DGPS data needed to correct said uncorrected GPS data, wherein said corrected GPS data indicate a corrected position.

23. The computer system of claim 22 wherein said steps b) through d) of said method are performed in real time substantially as said uncorrected GPS data and said DGPS data are received.

24. The computer system of claim 22 wherein said uncorrected GPS data and said corrected GPS data are substantially compliant with a National Marine Electronics Association (NMEA) format.

25. The computer system of claim 24 wherein said uncorrected GPS data and said corrected GPS data are substantially equivalent to data contained in a NMEA sentence selected from a group consisting of: a GGA sentence, a GSA sentence, a GNS sentence, a GLL sentence, a PTNL,GGK sentence, and a RMC sentence.

26. The computer system of claim 25 wherein said method further comprises the step of:
  replacing in a NMEA sentence said estimated position with said corrected position.

27. The computer system of claim 20 wherein said method further comprises the step of:
  correlating said information in said message with said uncorrected GPS data using a time tag in said message and a time tag in said uncorrected GPS data.

28. The computer system of claim 20 wherein said method further comprises the step of:
  correlating agricultural data to said corrected position.

29. The computer system of claim 20 further comprising:
  a receiver for receiving said uncorrected GPS data in a signal from said first broadcaster and said DGPS data in a signal from a second broadcaster.

30. The computer system of claim 29 wherein said first broadcaster is a GPS satellite and said second broadcaster is a GPS base station.

31. The computer system of claim 20 wherein said uncorrected GPS data and said message are stored in said computer-readable memory unit.

32. The computer system of claim 20 wherein said uncorrected GPS data and said message are stored in an external memory device.

* * * * *